(12) United States Patent
Takase et al.

(10) Patent No.: US 7,038,348 B2
(45) Date of Patent: May 2, 2006

(54) DYNAMO ELECTRIC MACHINE

(75) Inventors: Junichi Takase, Kiryu (JP); Masakazu Kawagishi, Ashikaga (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/512,685

(22) PCT Filed: May 12, 2003

(86) PCT No.: PCT/JP03/05871
§ 371 (c)(1), (2), (4) Date: Oct. 27, 2004

(87) PCT Pub. No.: WO03/098781
PCT Pub. Date: Nov. 27, 2003

(65) Prior Publication Data
US 2005/0168098 A1  Aug. 4, 2005

(30) Foreign Application Priority Data
May 16, 2002  (JP) .............................. 2002-141961

(51) Int. Cl.
*H02K 1/00*  (2006.01)
(52) U.S. Cl. ...................... 310/216; 310/254
(58) Field of Classification Search ................ 310/179, 310/216, 254, 156.01–156.09, 264, 269
See application file for complete search history.

(56) References Cited

U.S. PATENT DOCUMENTS

| | | | | |
|---|---|---|---|---|
| 3,978,356 | A | * 8/1976 | Spiesberger | 310/156.42 |
| 4,315,171 | A | * 2/1982 | Schaeffer | 310/49 R |
| 5,325,002 | A | * 6/1994 | Rabinowitz et al. | 505/166 |
| 6,208,054 | B1 | * 3/2001 | Tajima et al. | 310/46 |

FOREIGN PATENT DOCUMENTS

| | | |
|---|---|---|
| JP | 63-77363 | 4/1988 |
| JP | 2-84043 | 3/1990 |
| JP | 4-289759 | 10/1992 |
| JP | 2000-308317 | 11/2000 |

* cited by examiner

Primary Examiner—Darren Schuberg
Assistant Examiner—Nguyen Hanh
(74) Attorney, Agent, or Firm—Wenderoth, Lind & Ponack, L.L.P.

(57) ABSTRACT

A dynamo-electric machine comprises a stator having a plurality of salient poles wound with a coil, and a rotor fixed with a plurality of permanent magnets and disposed to rotate freely on an outer circumference of the stator. Salient poles becoming in-phase are arranged adjacently in a circumferential direction and these adjacent salient poles are disposed oppositely to the permanent magnets of different polarity at the same electric angle. These salient poles have coils wound in reverse directions. An angle between adjacently salient poles is set at 360°/N for in-phase, and an angle θ2 between adjacently salient poles is set at θ1+θ1/number of phases P for out-of-phase, where N is the number of poles of the permanent magnets, and the number of phases P×(θ1+θ2) is set at 180° or less.

25 Claims, 9 Drawing Sheets

DYNAMO ELECTRIC MACHINE

This application is a National Stage application of PCT/JP03/05871, filed May 12, 2003.

TECHNICAL FIELD

The present invention relates to a dynamo-electric machine connected to, e.g., an engine of a motorcycle and used as a generator or starter motor.

BACKGROUND ART

A dynamo-electric machine including, e.g., a generator or a motor is generally constituted by a stator wound with a coil, and a rotor provided with a permanent magnet. In the generator, the rotor is rotatively driven by an engine or the like to allow a rotating magnetic field produced by the permanent magnet to intersect with the coil, thereby generating an electromotive force on a stator side. On the other hand, in the motor, energization of the coil produces a rotating magnetic field, thereby rotatively driving the rotor. The above dynamo-electric machine can obtain high output in spite of its simple structure, and therefore is used as, e.g., a generator for a motorcycle, or a starter-generator that acts both as a starter and a generator.

FIG. 9 is an explanatory view showing a configuration related to a stator and a rotor of a conventional dynamo-electric machine. The dynamo-electric machine of FIG. 9 is a three-phase (U, V, W) type, and has an outer rotor structure in which a rotor 51 is disposed outside a stator 52. The rotor 51 is connected to, e.g., a crankshaft of an engine and is rotatably disposed outside the stator 52. The rotor 51 is provided with a rotor yoke 53 made of a magnetic material. A plurality of permanent magnets 54 is fixed to an inner circumferential surface of the rotor yoke 53 along a circumferential direction thereof. The stator 52 is provided with a stator core 56 having a plurality of salient poles 55 wound with a coil 57.

In the conventional three-phase dynamo-electric machine, the coil 57 of the stator core 56 is continuously wound around every third pole (salient pole 55), as shown in FIG. 9. The every third pole wound with the coil 57 of the same phase faces a magnet having the same polarity as the pole at the same electric angle. In FIG. 9, every third pole, for example, U-phase poles U1 to U4 face N-pole permanent magnets 54 on central axes thereof. Therefore, in the conventional dynamo-electric machine, the permanent magnets 54 and salient poles 55 are arranged at regular intervals, respectively. That is, the permanent magnets 54 are evenly divided into N-pole magnets and S-pole magnets, and the number of poles N is denoted by 2n. The salient poles 55 are also evenly divided, and the number of poles M on a stator side is denoted by 3m in a case of a three-phase type. Here, n is equal to an integral multiple of m. In the case of the dynamo-electric machine shown in FIG. 9, the number of poles N of the permanent magnets 54 is sixteen (n=8), and the number of poles M on the stator side is twelve (m=4; n=2m).

However, when the above conventional dynamo-electric machine is used as a generator for a motorcycle to ensure current generated in an idling rotation range as much as possible, generated current at a middle to high rotation level becomes larger than a consumption current of the machine, resulting in redundant current. Generation of the redundant current correspondingly increases engine friction (engine load) to lead to unfavorable mileage or loss of horsepower. Further, in the generator itself, heat generated in the coil is increased up to close to its heat resistance limit.

In order to cope with the redundant current, a number of turns of the coil is increased, or a thickness of the stator core is increased to obtain larger coil inductance. This suppresses a current generated at a middle to high rotation level, thereby reducing coil temperature. However, it is now impossible to significantly increase a number of turns of the coil in view of available winding space. Further, restrictions on design of a car body make it impossible to increase thickness of the stator core. Thus, under existing circumstance, various types of forced cooling mechanisms are employed to squirt engine oil, form a cooling groove, or the like, thereby reducing heat generated in the coil. However, when the above countermeasures are employed, it becomes impossible to obtain high output, which is demanded due to future load increase, unless a size of the generator itself is increased. It is difficult to increase the size of the generator in a situation where miniaturization of the machine is requested. Thus, there has been a need to develop a dynamo-electric machine capable of increasing current amount at a low rotation level and, at the same time, suppressing current generated at a middle to high rotation level while maintaining a current machine size.

SUMMARY OF THE INVENTION

An object of the present invention is to provide a dynamo-electric machine capable of increasing current amount at a low rotation level and, at the same time, suppressing current generated at a middle to high rotation level to reduce heat generated in a coil while maintaining a current machine size.

A dynamo-electric machine of the present invention comprising a stator having a plurality of salient poles wound with a coil; and a rotor rotatably disposed on an outer or inner circumference of the stator and having a plurality of permanent magnets fixed thereto along a circumferential direction so as to face the salient poles, is characterized in that the salient poles of a same phase are adjacently disposed in the circumferential direction, adjacently disposed salient poles face the permanent magnets having opposite polarities relative to each other at a same electric angle, the adjacently disposed salient poles of the same phase constitute a pole-pair, and two pole-pair groups, each of which is constituted by pole-pairs corresponding to the numbers of phases, are disposed point-symmetrically with respect to a center of the stator, and a space for allowing additional arrangement of salient poles are formed between the pole-pair groups.

In the dynamo-electric machine which is allowed to function as a generator, it is possible to make a magnetic path caused between the salient poles of the pole-pair at a time of power generation shorter than in a case of the dynamo-electric machine having the same pole numbers of the permanent magnets to make coil inductance larger than coil inductance in the dynamo-electric machine having the same pole numbers of the permanent magnets.

Further, in the dynamo-electric machine which is allowed to function as a generator, magnetic paths are formed between the salient poles of the pole-pair and between the salient poles of an adjacently disposed pole-pair, and a number of fluxes formed between the salient poles of the pole pair can be greater than fluxes formed between the salient poles of an adjacently disposed pole-pair.

According to the present invention, the dynamo-electric machine has obtained a configuration in which the salient poles of the same phase are adjacently disposed to allow them to respectively face the permanent magnets having opposite polarities relative to each other at the same electric angle. This allows a magnetic path to be shortened as well as a number of effective fluxes to be increased. It is, thus, possible to suppress output at a middle to high rotation level to reduce coil temperature, and can increase output at a low rotation level, while maintaining a size corresponding to that of a conventional generator. Therefore, it is possible to significantly reduce heat of the coil while maintaining output performance equivalent to or superior to the conventional generator, which reduces engine friction to allow engine mileage to be increased and horsepower loss to be prevented. Further, it is possible to obtain high output of the generator while the size of the generator is maintained. This allows the dynamo-electric machine of the present invention to cope with further increase in load in a motorcycle or the like without increasing a physical size of the machine and adding any forced cooling mechanism. Furthermore, the salient poles of the same phase are disposed point-symmetrically with respect to a center of the stator, realizing a favorable magnetic balance at a time of rotation. As a result, effective rotation can be achieved.

In the dynamo-electric machine, each of the adjacently disposed salient poles of the same phase may have coils wound in reverse directions. A value of angle θ1 between adjacently disposed salient poles of the same phase may be set at 360°/N, and a value of angle θ2 between adjacently disposed salient poles of different phases may be set at θ1+θ1/number of phases P, where N is the number of poles of the permanent magnets. Further, in the dynamo-electric machine number of phases P×(θ1+θ2) is set at at most 180°.

It is possible to form a pole-pair with the adjacently disposed salient poles having the same phase, and to additionally dispose salient poles between the pole-pair, thereby realizing augmentation of output of the dynamo-electric machine. Further, it is possible to form a pole-pair with the adjacently disposed salient poles having the same phase, and to dispose two pole-pair groups, each of which is constituted by pole-pairs corresponding to the numbers of phases, in a point-symmetrical position with respect to a center of the stator. In this case, the salient poles can be disposed between the pole-pair groups.

Further, the dynamo-electric machine may be an outer-rotor type in which the stator is disposed inside of the rotor, or an inner-rotor type in which the rotor is disposed at the inside of the stator.

In addition, the dynamo-electric machine may be a generator, a motor, or starter-generator for a motorcycle.

DETAILED DESCRIPTION OF THE PREFERRED EMBODIMENTS

First Embodiment

Figure 1:
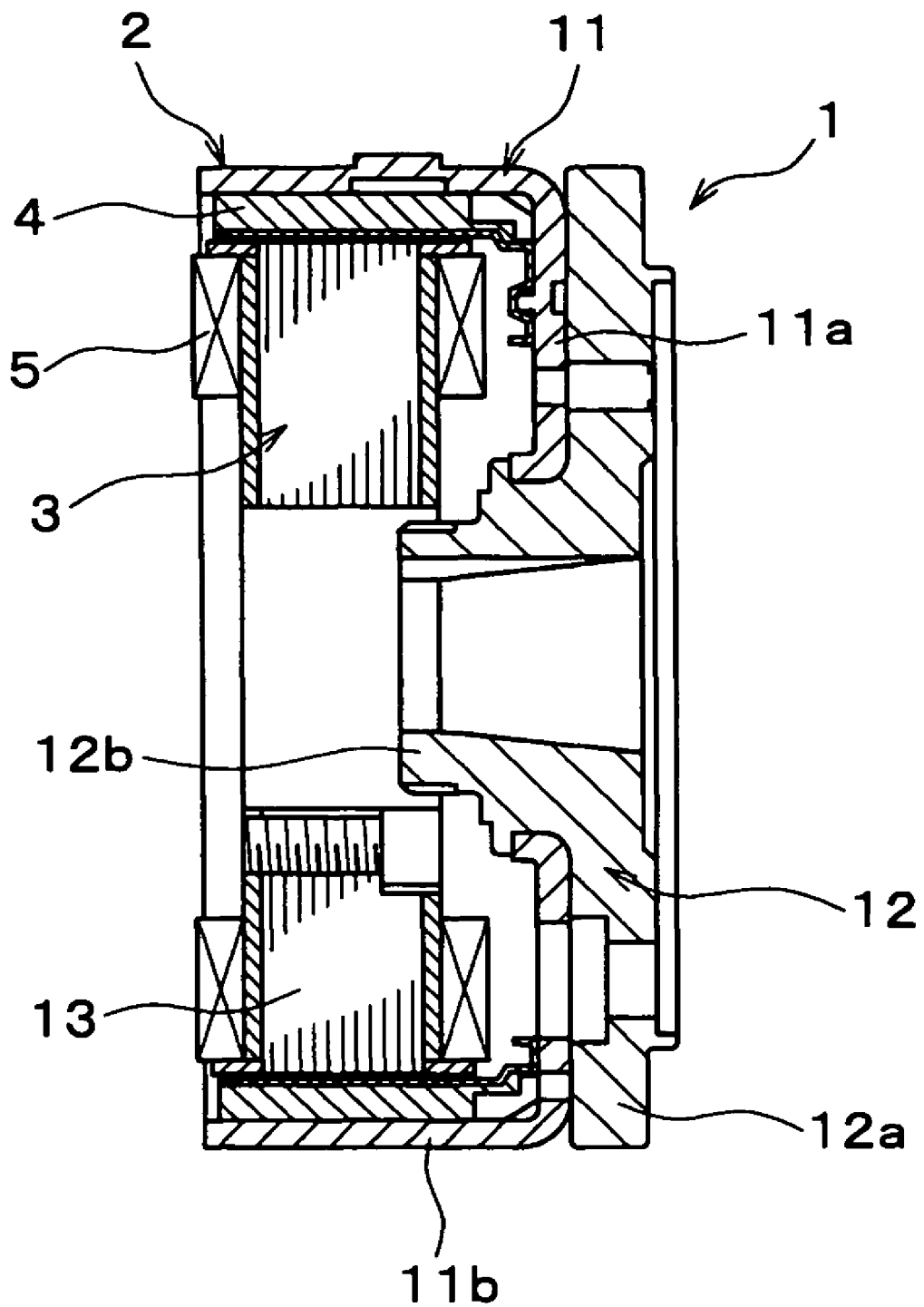
FIG. 1 is a cross-sectional view showing a configuration of a dynamo-electric machine according to a first embodiment of the present invention.

Embodiments of the present invention will be described below in detail with reference to the accompanying drawings. FIG. 1 is a cross-sectional view showing a configuration of a dynamo-electric machine according to a first embodiment of the present invention. The dynamo-electric machine 1 of FIG. 1 is a so-called outer-rotor type dynamo-electric machine, and is used as an ACG (Alternating-Current Generator) in, e.g., a motorcycle. A generator shown in FIG. 1 roughly includes a rotor 2 and a stator 3. Here, the rotor 2 acts as a magnetic-field generator and the stator 3 acts as an armature. A permanent magnet 4 is attached to the rotor 2, and a coil 5 is attached to the stator 3. When the rotor 2 rotates exteriorly of the coil 5, a rotating magnetic field produced by the permanent magnet 4 intersects with the coil 5 to generate an electromotive force in the coil 5, thereby performing power generation.

The rotor 2 is connected to a crankshaft (not shown) of an engine. The rotor 2 is rotatably disposed outside the stator 3, and also functions as a flywheel. The rotor 2 is provided with a rotor yoke 11 having a closed-bottomed cylindrical shape and a boss rotor 12 attached to the rotor yoke 11 and fixed to the crankshaft. The rotor yoke 11 and boss rotor 12 are made of a magnetic material such as iron. The boss rotor 12 includes a plate-shaped flange portion 12a and a boss portion 12b having substantially a cylindrical shape. The flange portion 12a is concentrically attached to a bottom portion 11a of the rotor yoke 11. The boss portion 12b projects from the flange portion 12a along a rotational center line and is taper coupled to the crankshaft. Rotation of the crankshaft rotates the boss portion 12b to cause the rotor 2 to be rotated outside the coil 5.

On an inner circumferential surface of a cylindrical portion 11b of the rotor yoke 11, a plurality of permanent magnets 4 are arranged along a circumferential direction of the rotor yoke 11. The permanent magnets 4, here sixteen magnets are arranged at intervals of 22° 30' in even shares such that N-poles and S-poles are alternately arranged as polarities on an inner surface side. That is, the number of poles N of the permanent magnets 4 is sixteen (n=8), as in the case of the dynamo-electric machine of FIG. 9.

The stator 3 includes a stator core 13 formed by stacking a plurality of steel plates. Formed on the stator core 13 are a plurality of salient poles 14 around each of which a coil 5 is wound. The dynamo-electric machine 1 is a generator that generates a three-phase alternating current, in which four salient poles 14 are assigned to each of the phases U, V, and X, and the number of poles M on the stator 3 side is twelve (M=3m; m=4).

Figure 2:
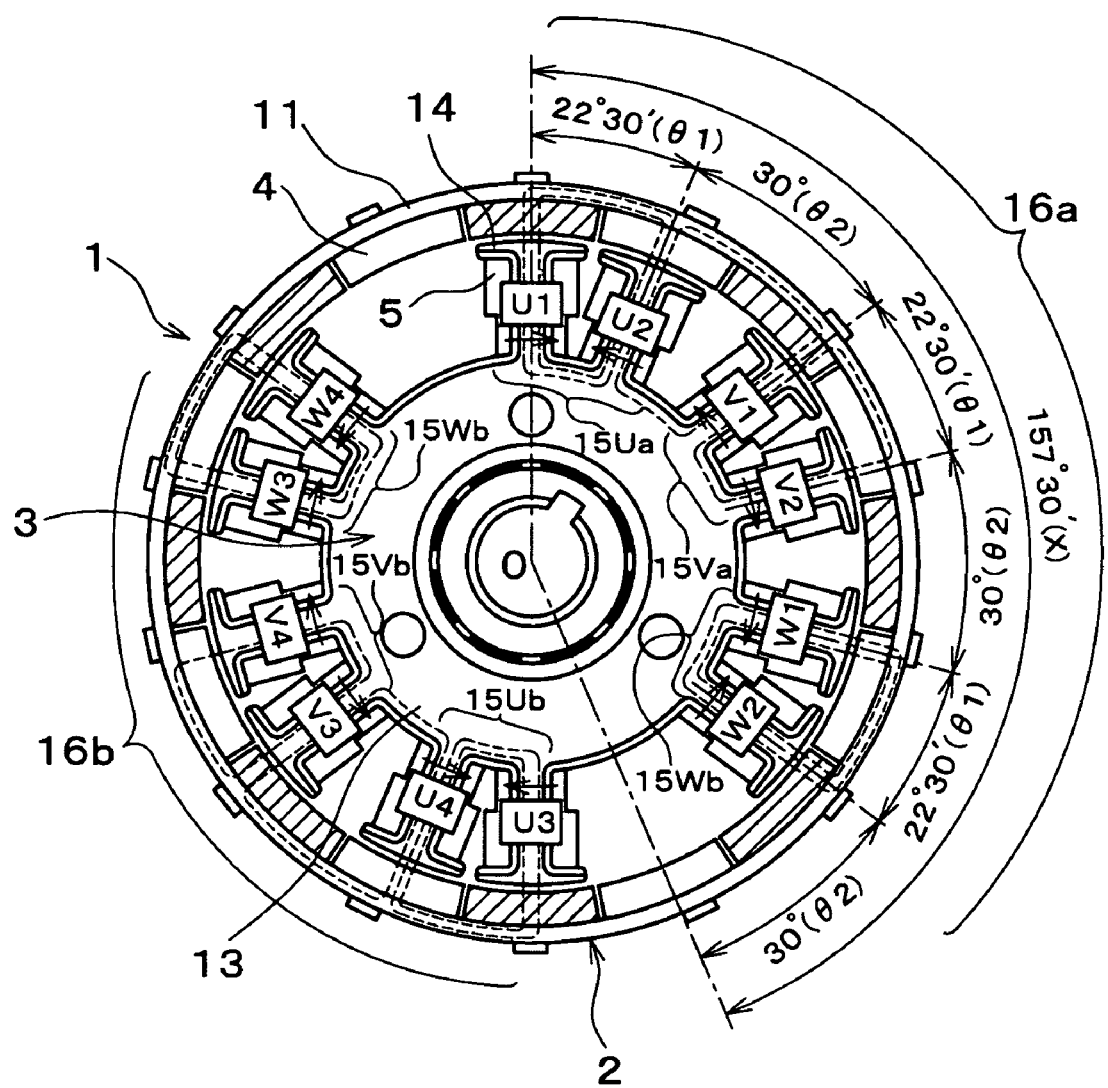
FIG. 2 is an explanatory view showing a positional relationship between a rotor and stator in the dynamo-electric machine of FIG. 1.
Figure 9:
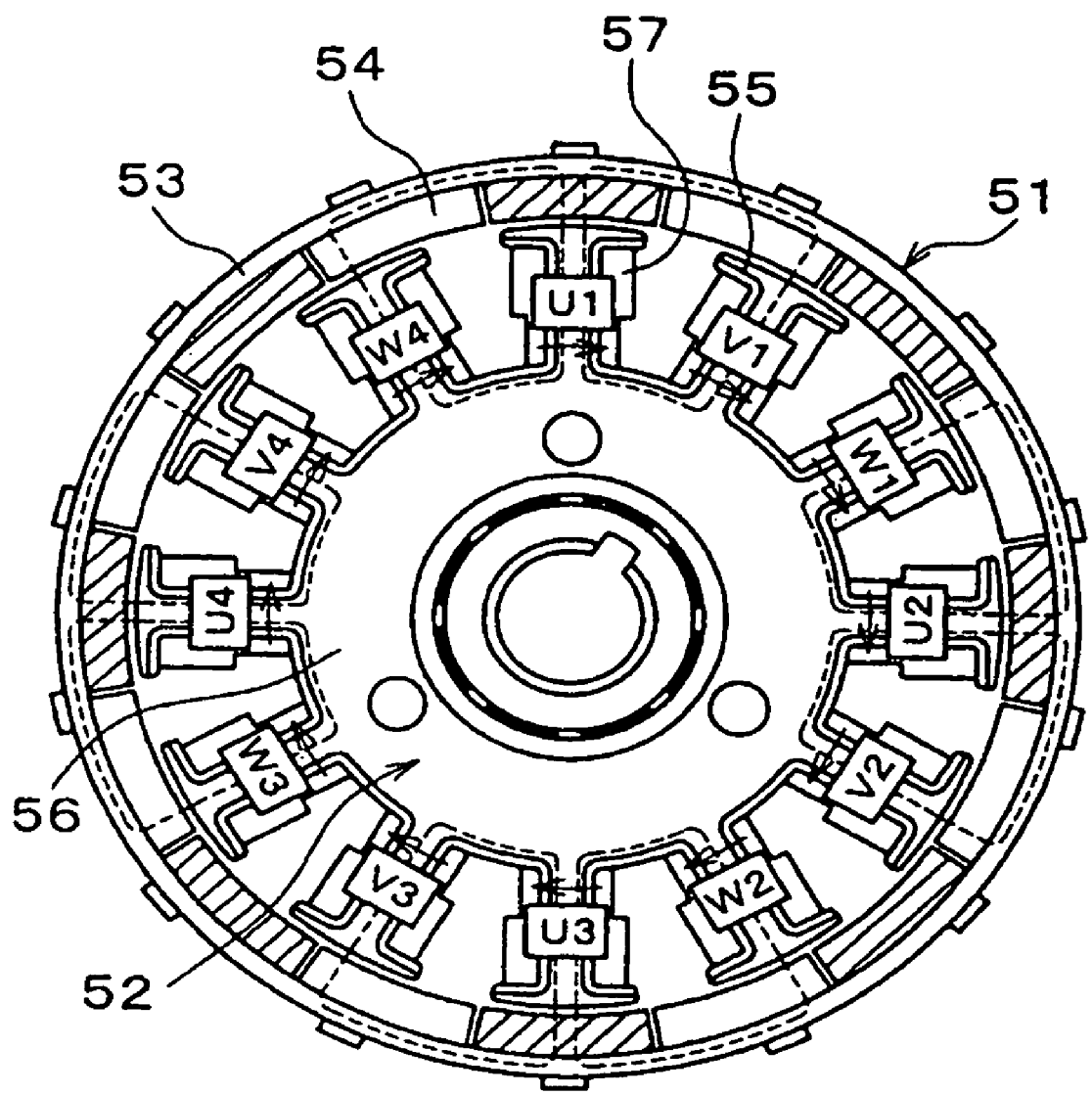
FIG. 9 is an explanatory view showing a configuration related to a stator and rotor of a conventional dynamo-electric machine.

Unlike the case of the conventional dynamo-electric machine shown in FIG. 9, the salient poles 14 are not arranged at regular intervals in the dynamo-electric machine 1. FIG. 2 is an explanatory view showing a positional relationship between the rotor 2 and the stator 3 in the dynamo-electric machine 1. As shown in FIG. 2, the salient poles 14 having the same phase are adjacently disposed in the circumferential direction. These adjacently disposed salient poles 14, which have the same phase, respectively face the permanent magnets 4 having opposite polarities relative to each other at the same electric angle. Winding directions of the coil 5 in the adjacently disposed salient poles 14 of the same phase are opposed to each other as shown by arrows in FIG. 2 in correspondence with polarities exhibited by the permanent magnets 4 that face the salient poles 14.

A concrete description will be given of U-phase, for example. Salient pole U1 (hereinafter, salient poles are denoted by only using symbols. For example, salient pole U1 is referred to as merely "U1") and U2 of U-phase are adjacently disposed to form a pole-pair 15Ua. An angle $\theta1$ between U1 and U2 is set at 22° 30' (360°/N; N=16), which corresponds to an arrangement interval of the permanent magnets 4, so that U1 and U2 simultaneously face N-pole and S-pole on their central axes, respectively. The winding directions of the coil 5 in U1 and U2 are opposed to each other.

Similarly, V1 and V2 of V-phase, and W1 and W2 of W-phase are adjacently disposed to form pole-pairs 15Va and 15Wa, respectively. In the pole pairs 15Va and 15Wa, the angles $\theta1$ between the adjacent salient poles of same phase are set at 22° 30' so as to face the permanent magnets 4 having opposite polarities relative to each other at the same electric angle, respectively. The winding directions of the coil 5 are opposed to each other between V1 and V2, and W1 and W2. These pole-pairs 15Ua, 15Va, and 15Wa corresponding to three phases constitute one pole-pair group 16a.

On the other hand, an angle $\theta2$ between adjacent salient poles of different phases (for example, between U2 and V1) is set at $\theta1+\theta1$/number of phases P. That is, the angle $\theta2$ between the adjacent salient poles of different phases is obtained by adding an angle value calculated by dividing $\theta1$ between the adjacent salient poles of the same phase by the number of phases P to $\theta1$. $\theta1$ is equal to the arrangement interval of the permanent magnets 4. When a value obtained by dividing $\theta1$ by the number of phases is added to $\theta1$ to obtain $\theta2$, an angle X of the pole-pair group 16a is an integral multiple of the arrangement interval of the permanent magnets 4 since the number of pole-pairs included in the pole-pair group 16a is equal to that of phases. When the angle X (=number of phases P×($\theta1+\theta2$)) of the pole-pairs group is equal to or less than 180°, another pole-pair group can be disposed on the stator 3.

In the case of FIG. 2, $\theta2$ is set at 30° (=22° 30'+22° 30'/3). The angle X of the pole-pair group 16a is 157° 30' (=3×(22° 30'+30°)), which is equal to or less than 180°. Therefore, another pole-pair group can be disposed on the stator 3. That is, another pole-pair group 16b including pole-pairs 15Ub, 15Vb, and 15Wb is disposed such that the pole-pair groups 16a and 16b are point-symmetrical with respect to a center point O of the stator 3. In the pole-pair group 16b, values of $\theta1$, $\theta2$, and X are set at exactly the same values as those in the pole-pair group 16a.

As shown in FIG. 2, when U1 and U2 face the permanent magnets 4 having the opposite polarities relative to each other at the same electric angle, respectively, U3 and U4 also face the permanent magnets 4 having the opposite polarities relative to each other at the same electric angle, respectively. The same relationships between V1 and V2, W1 and W2 are applied to those between other salient poles V3 and V4, W3 and W4.

In the above dynamo-electric machine 1, a magnetic path caused at a time of power generation is formed between U1 and U2, U2 and V1, or the like, as shown in FIG. 2. The angle between the salient poles U1 and U2 is 22° 30', as described above. In this case, the magnetic path between U1 and U2 is shorter than in the case of FIG. 9 (30°). Since coil inductance is in inverse proportion to a length of a magnetic path in general, coil inductance in the dynamo-electric machine 1 of FIG. 2 is larger than coil inductance in the dynamo-electric machine of FIG. 9. That is, it is possible to increase coil inductance without increasing the number of turns of a coil or a stacked thickness of a stator core. Therefore, it becomes possible to suppress current generated in a middle to high rotation level of an engine, and to reduce a temperature of the coil 5.

According to an experiment of the present inventors, an output of 16.4 A and a coil temperature of 80° C. were obtained at a rotation rate of 5,000 RPM in the case of the configuration shown in FIG. 9, whereas the configuration of FIG. 2 brought the output and coil temperature down to 14.8 A and 62° C. with the same rotation rate of 5,000 RPM.

It is assumed that two fluxes are generated in one salient pole. Considering this as a reference, two fluxes are generated between U1 and U2, and one flux is generated between U2 and V1 in the dynamo-electric machine of FIG. 2. Therefore, in terms of U-phase, two fluxes are passed through each of U1 and U3 and three fluxes are passed through each of U2 and U4 as shown in FIG. 2, with the result that the total number of fluxes generated in U-phase becomes ten. On the other hand, in the case of the configuration of FIG. 9, two fluxes are respectively passed through each of U1, U2, U3, and U4 with the result that the total number of fluxes generated in U-phase becomes eight. That is, larger numbers of effective fluxes are obtained in each phase in the dynamo-electric machine 1 of FIG. 2 as compared to the conventional dynamo-electric machine, thereby increasing output at a low rotation level.

According to the experiment of the present inventors, flux density per one salient pole was 10,200 Mx in the configuration of FIG. 9, whereas flux density was increased to 10,700 Mx in the configuration of FIG. 2, which corresponds to an increase of 2,000 Mx with four salient poles. Accordingly, an output of 2.6 A was obtained with 1,500 RPM in the configuration of FIG. 9, whereas an output of 3.4 A was obtained with the same 1,500 RPM in the configuration of FIG. 9.

As described above, the configuration of the dynamo-electric machine 1 can suppress output at a middle to high rotation level to reduce coil temperature, and can increase output at a low rotation level, while maintaining a size corresponding to that of the conventional dynamo-electric machine. Therefore, it is possible for the dynamo-electric machine of the present embodiment to significantly reduce heat of the coil while maintaining output performance equivalent to or superior to the conventional generator, which reduces engine friction to allow engine mileage to be increased and horsepower loss to be prevented. Further, it is possible to obtain high output of the generator while the size of the generator is maintained. This allows the dynamo-electric machine of the present embodiment to cope with increase in load in a motorcycle or the like without increasing a physical size of the machine and adding any forced cooling mechanism.

Second Embodiment

Figure 3:
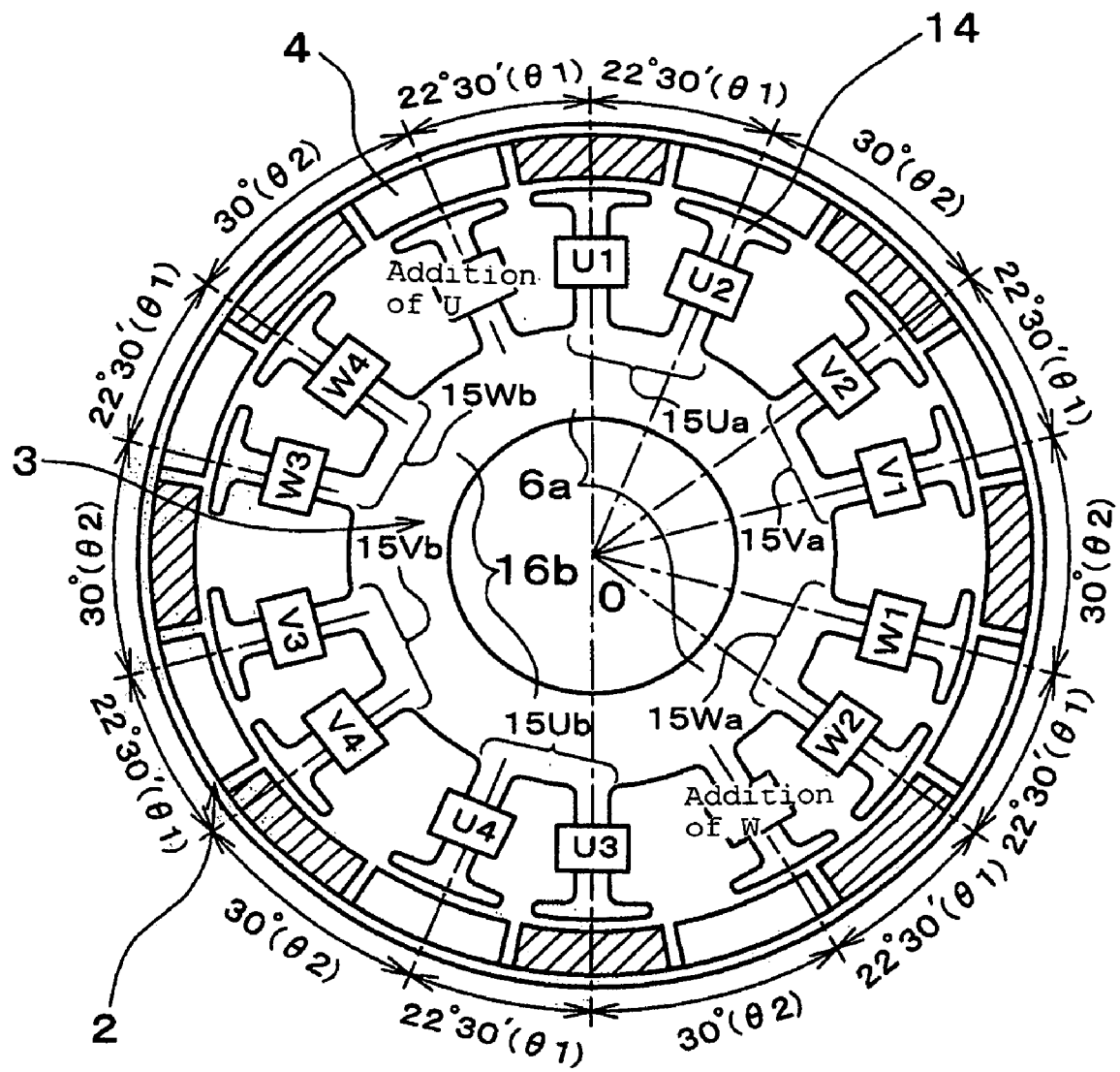
FIG. 3 is an explanatory view showing a positional relationship between the rotor and the stator in the dynamo-electric machine according to a second embodiment of the present invention.

Next, a description will be given of a dynamo-electric machine obtained by adding salient poles to that shown in FIG. 2, as a second embodiment. FIG. 3 is an explanatory view showing a positional relationship between rotor 2 and stator 3 in the dynamo-electric machine according to the second embodiment of the present invention. Note that in the following embodiments, the same reference numerals as the first embodiment are given to components which are common to the first embodiment, and an overlapped description is omitted. Further, as to a configuration of the stator 3, only basic structure is shown with minor details omitted in order to make the overall structure clearer.

In the dynamo-electric machine of FIG. 2, the angle X of the pole-pair group 16a is 157° 30', and 22° 30' is obtained as a residual angle by subtracting this 157° 30' from 180°. This obtained residual angle corresponds to the aforementioned θ1, so that spaces to dispose additional salient poles exist at both ends between the pole-pair groups 16a and 16b, as shown in FIG. 2. When θ1 is equal to or less than 180°−X (180°−X≧θ1), two salient poles can additionally be disposed. When 2θ1 is equal to or less than 180°−X (180°−X≧2θ1), four salient poles can additionally be disposed. When 3θ1 is equal to or less than 180°−X (180°−X≧3θ1), six salient poles can additionally be disposed.

In the dynamo-electric machine shown in FIG. 3, U-phase salient pole and W-phase salient pole are additionally disposed in upper and lower spaces of FIG. 3 respectively, so as to obtain further increase in output. According to the experiment of the present inventors, outputs of 3.4 A, 14.8 A were obtained respectively with 1,500 RPM and 5,000 RPM in the configuration of FIG. 2, whereas outputs were increased to 5.9 A, 15 A with 1,500 RPM and 5,000 RPM, respectively in the configuration of FIG. 3. In this case, since output at a high rotation level is suppressed due to increase in inductance, increase in output at a low rotation level is noticeable, thereby realizing effective augmentation of output while suppressing temperature rise.

The salient pole to be added is not limited to U-phase or W-phase, and a V-phase salient pole may be added. Further, although the salient poles of different phases are added in the case of FIG. 3, it is possible to add the salient poles of the same phase (for example, two U-phase salient poles may be added to the configuration of FIG. 3).

Third Embodiment

Figure 4:
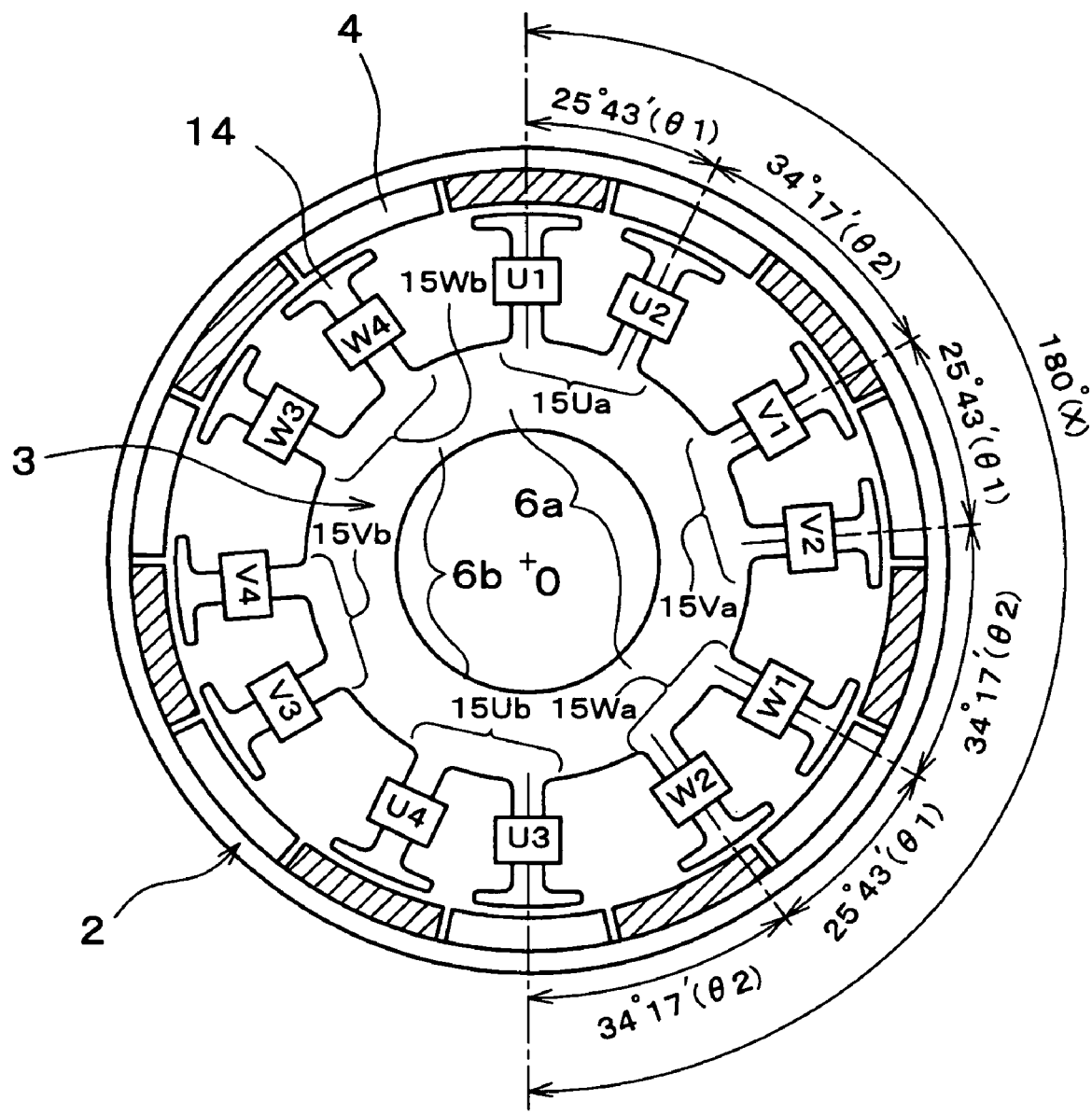
FIG. 4 is an explanatory view showing a positional relationship between the rotor and the stator in the dynamo-electric machine according to a third embodiment of the present invention.

As a third embodiment, a dynamo-electric machine having fourteen poles of permanent magnets and twelve salient poles will be described. FIG. 4 is an explanatory view showing a positional relationship between rotor 2 and stator 3 in the dynamo-electric machine according to third embodiment of the present invention.

In the dynamo-electric machine shown in FIG. 4, fourteen permanent magnets 4 are equally spaced at intervals of 25° 43' (N=14; n=7). The number of salient poles 14 disposed on the stator 3 side are twelve (=3m; m=4). The value of θ1 is set at 25° 43' (360°/N; N=14), which corresponds to an arrangement interval of the permanent magnets 4. The value of θ2 is set at 34° 17' (=25° 43'+25° 43'/3). The angle X of pole-pair group 16a is equal to 180° (=3×(25° 43'+34° 17')). In this case, the angle X (180°) from 180° leaves 0°, so that a salient pole cannot be added.

Fourth Embodiment

Figure 5:
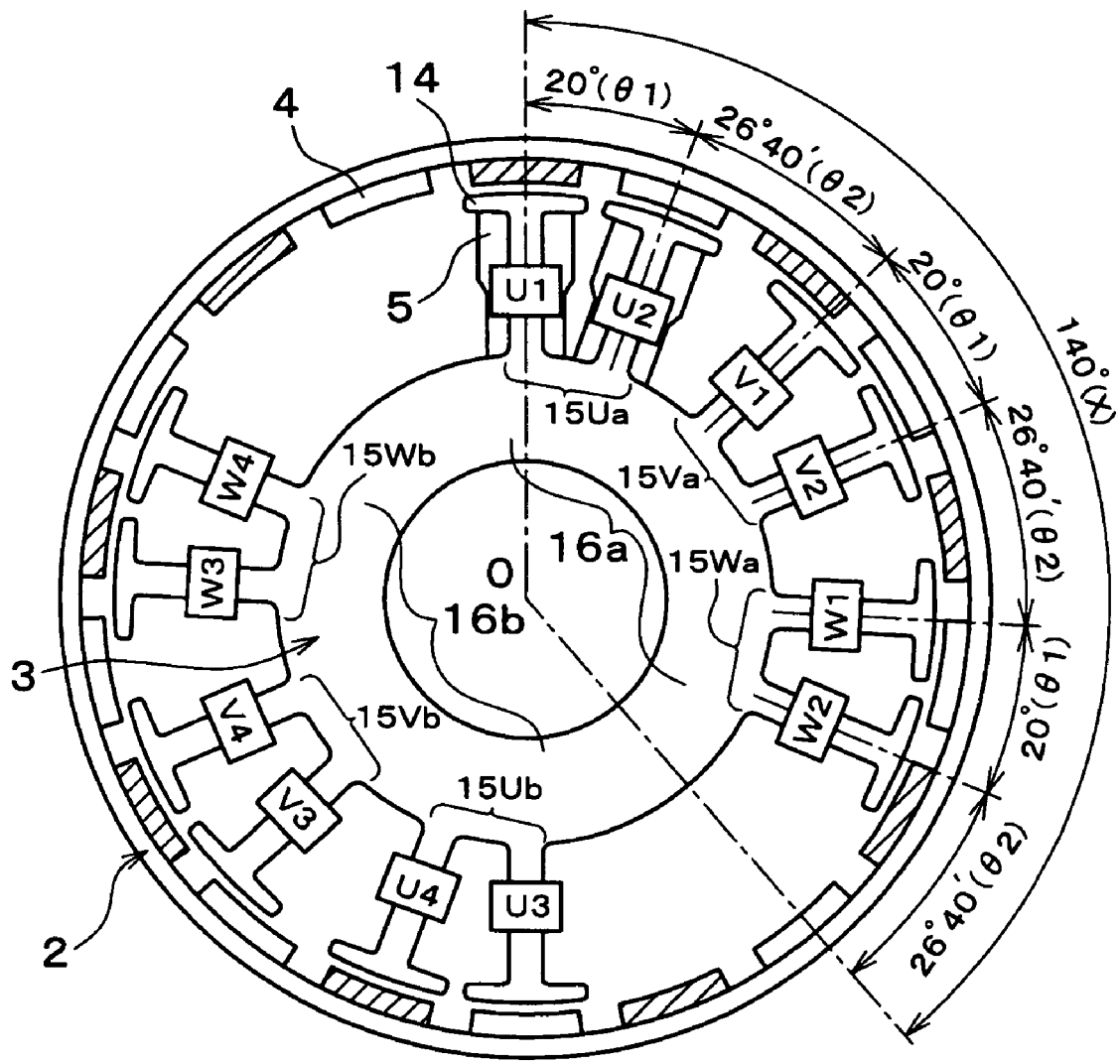
FIG. 5 is an explanatory view showing a positional relationship between the rotor and the stator in the dynamo-electric machine according to a fourth embodiment of the present invention.

As a fourth embodiment, a dynamo-electric machine having eighteen poles of permanent magnets and twelve salient poles will be described. FIG. 5 is an explanatory view showing a positional relationship between rotor 2 and stator 3 in the dynamo-electric machine according to the fourth embodiment of the present invention.

In the dynamo-electric machine shown in FIG. 5, eighteen permanent magnets 4 are equally spaced at intervals of 20° (N=18; n=9). The value of θ1 is also set at 20° (360°/N; N=18). The value of θ2 is set at 26° 40' (=20°+20°/3). The angle X of pole-pair group 16a is equal to 140° (=3×(20°+26° 40')).

Figure 6:
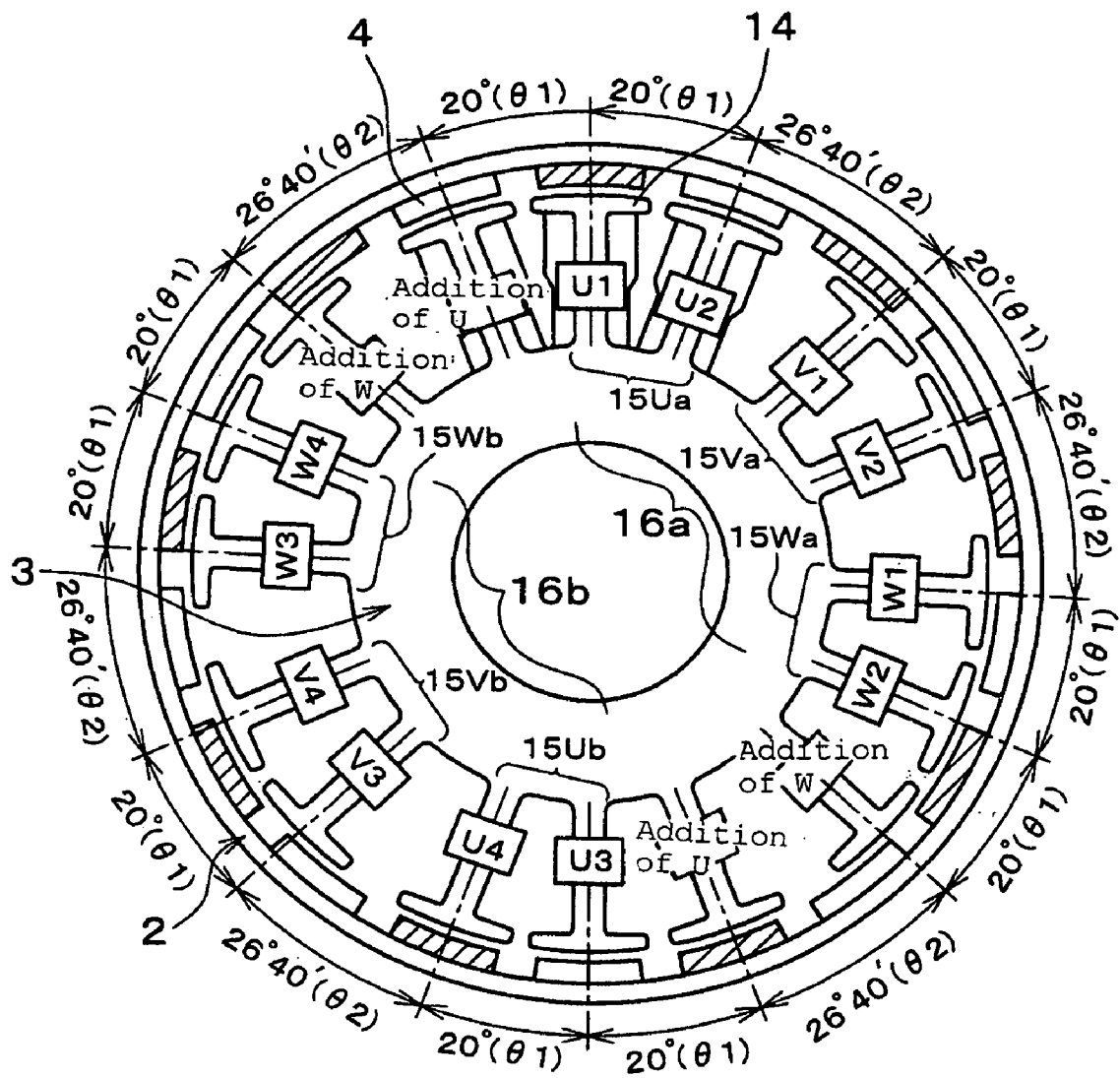
FIG. 6 is an explanatory view showing a case where salient poles are added to a configuration of the dynamo-electric machine of FIG. 5.

In the case of FIG. 5, 180°−X=180°−140°=40°≧2θ1 is satisfied, so that four salient poles can be added. FIG. 6 is an explanatory view showing a case where salient poles are added to the configuration of the dynamo-electric machine of FIG. 5. In this case, one pair of U- and W-phase salient poles 14 is respectively added to two spaces formed between pole-pairs groups 16a and 16b, thereby realizing effective augmentation of output.

Fifth Embodiment

Figure 7:
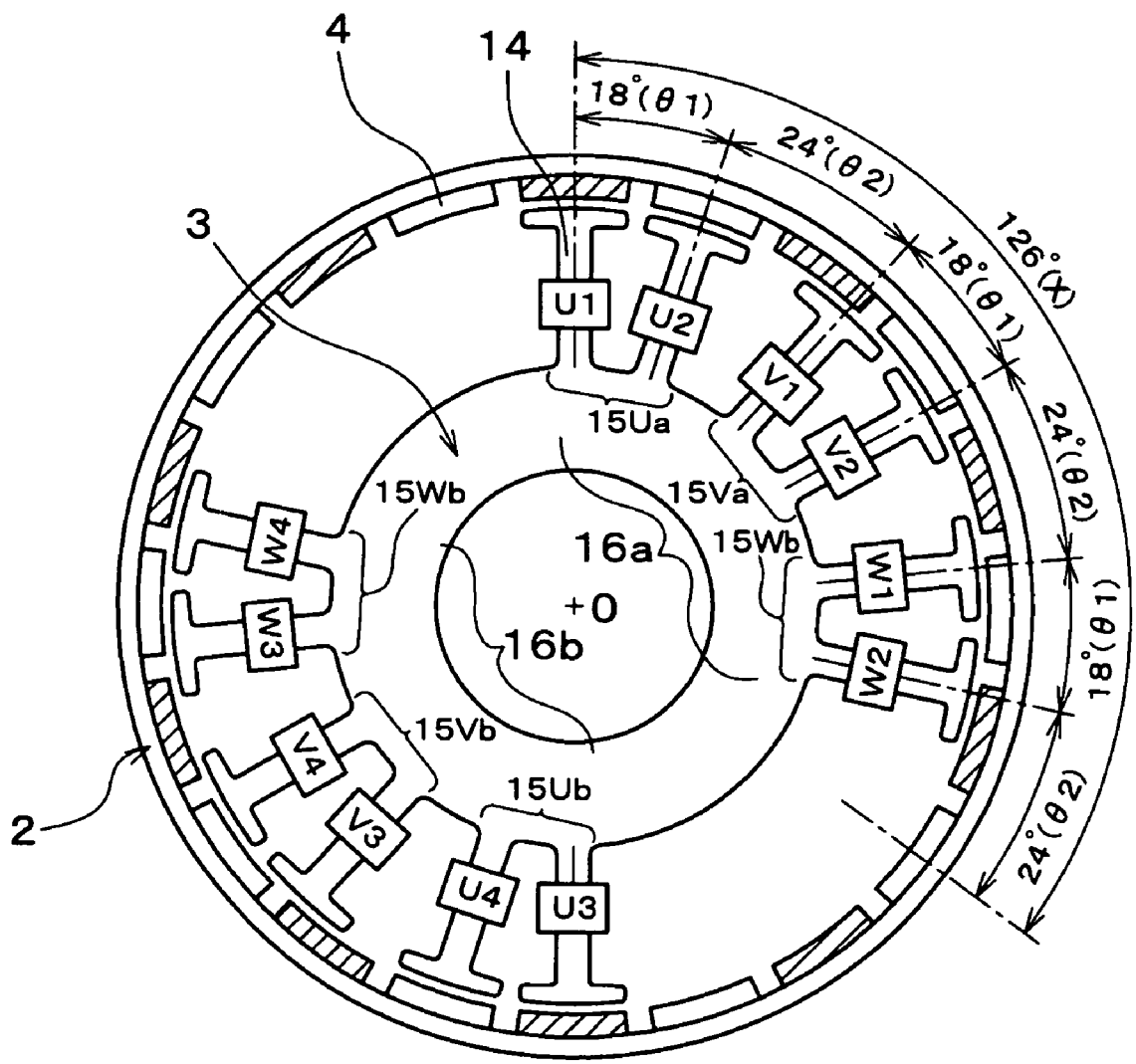
FIG. 7 is an explanatory view showing a positional relationship between the rotor and the stator in the dynamo-electric machine according to fifth embodiment of the present invention.

As a fifth embodiment, a dynamo-electric machine having twenty poles of permanent magnets and twelve salient poles will be described. FIG. 7 is an explanatory view showing a positional relationship between rotor 2 and stator 3 in the dynamo-electric machine according to fifth embodiment of the present invention.

In the dynamo-electric machine shown in FIG. 7, twenty permanent magnets 4 are equally spaced at intervals of 18° (N=20; n=10). The value of θ1 is also set at 18° (360°/N; N=20). The value of θ2 is set at 24° (=18°+18°/3). The angle X of pole-pairs group 16a is equal to 126° (=3×(18°+24°)).

Figure 8:
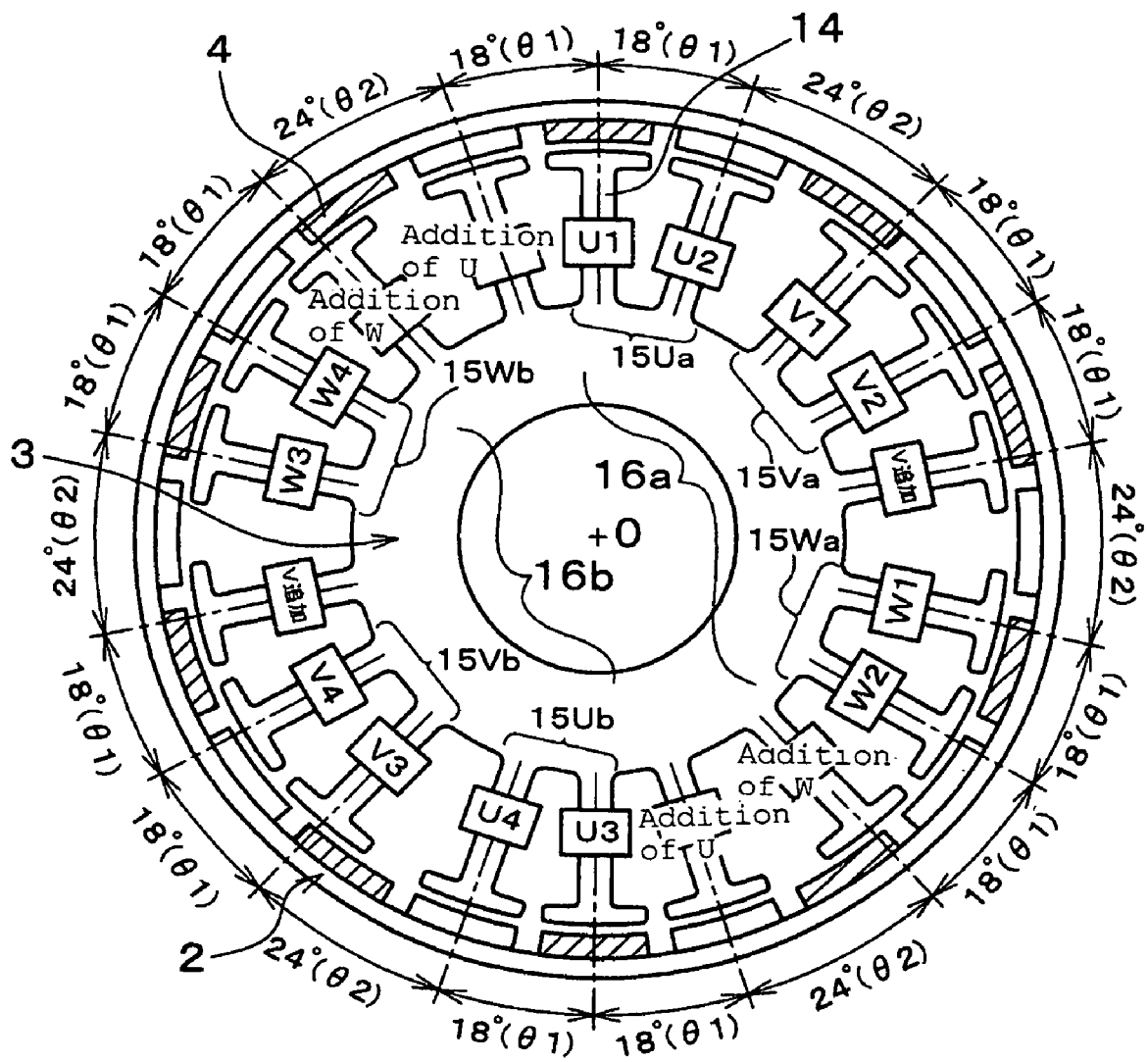
FIG. 8 is an explanatory view showing a case where salient poles are added to a configuration of the dynamo-electric machine of FIG. 7.

In the case of FIG. 7, 180°−X=180°−126°=54°≧3θ1 is satisfied, so that six salient poles 14 can be added as described above. FIG. 8 is an explanatory view showing a case where salient poles are added to the configuration of the dynamo-electric machine of FIG. 7. In this case, salient poles 14 are added to not only between pole-pair groups 16a and 16b, but to between pole-pairs of each of the pole-pair groups. That is, two pairs of U-and W-phase salient poles 14 are added respectively to between the pole-pair groups 16a and 16b (between pole-pairs 15Ua and 15Wb, and between pole-pairs 15Wa and 15Ub). In addition, one V-phase salient pole 14 is each added to between the pole-pairs 15Va and 15Wa, and pole-pairs 15Vb and 15Wb. In other words, in FIG. 8, six salient poles 14 are respectively added to positions next to the pole-pairs 15Ua, 15Va, 15Wa, 15Ub, 15Vb, and 15Wb.

It goes without saying that the present invention is not limited to the above embodiments, and various changes may be made without departing from the scope of the invention.

For example, it is possible for the dynamo-electric machine to perform power generation with only one pole-pair group 16a, and it is not always necessary that the pole-pair group 16b to be paired be added. Therefore, if the angle X exceeds 180°, a configuration of the present invention can be realized. Further, in a case where the number of the permanent magnets 4 corresponds to less than fourteen poles (for example, twelve poles), a configuration of the present invention can also be realized. Furthermore, it is not always necessary that the pole-pairs 15Ua included in the pole-pair group 16a have a plurality of salient poles 14. For example, a configuration in which a pole-pair is formed in U- and V-phase, and a single pole is formed as W-phase, can be employed. That is, the pole-pair in the present invention can be constituted not only by a plurality of salient poles, but also by a single salient pole.

In the above embodiments, the dynamo-electric machine of the present invention is used as a generator. Alternatively, however, it is possible to employ the dynamo-electric machine of the present invention as a motor. Further, the present invention can be applied to a machine functioning both as a generator and motor, such as an ACG starter for a motorcycle. In a case where the dynamo-electric machine of the present invention is used as a motor, it is possible to realize a motor in which heat of a coil can be significantly reduced with an output equal to or more than an output of a conventional motor. Further, it is possible to increase motor output (torque) while maintaining the same size as that of the conventional motor. In addition, although the dynamo-electric machine of the present invention is applied to a generator for a motorcycle in the above embodiment, it is possible to apply the present invention to a generator or motor for other uses.

In the above embodiment, the dynamo-electric machine of the present invention is applied to an outer-rotor type dynamo-electric machine. Alternatively, however, the present invention may be applied to a so-called inner-rotor type dynamo-electric machine in which a rotor is disposed inside of a stator. Further, although three-phase dynamo-electric machine is described in the above embodiment, it is possible to apply the present invention to another phase dynamo-electric machine including, for example, a five-phase dynamo-electric machine.

INDUSTRIAL APPLICABILITY

According to the present invention, the dynamo-electric machine has obtained a configuration in which salient poles of a same phase are adjacently disposed to allow them to respectively face permanent magnets having opposite polarities relative to each other at a same electric angle. This allows a magnetic path to be shortened as well as a number of effective fluxes to be increased. It is, thus, possible to suppress output at a middle to high rotation level to reduce coil temperature, and can increase output at a low rotation level, while maintaining a size corresponding to that of a conventional generator. Therefore, it is possible to significantly reduce heat of the coil while maintaining output performance equivalent to or superior to the conventional generator, which reduces engine friction to allow engine mileage to be increased and horsepower loss to be prevented. Further, it is possible to obtain high output of the generator while the size of the generator is maintained. This allows the dynamo-electric machine of the present invention to cope with increase in load in a motorcycle or the like without increasing a physical size of the machine and adding any forced cooling mechanism.

Further, according to the configuration of the dynamo-electric machine of the present invention, a pole-pair is constituted by adjacently disposed salient poles of the same phase, and additional salient poles can be disposed between pole-pairs, thereby realizing further augmentation of output in the dynamo-electric machine.

The invention claimed is:

1. A dynamo-electric machine comprising:
   a stator having salient poles each wound with a coil;
   a rotor rotatably disposed on one of an outer circumference and an inner circumference of said stator, said rotor having permanent magnets fixed thereto along a circumferential direction thereof; and
   two pole-pair groups disposed point-symmetrically with respect to a center of said stator, with space for allowing an additional arrangement of salient poles being defined between said two pole-pair groups,
   wherein each one of said two pole-pair groups includes pole pairs each composed of circumferentially adjacent ones of said salient poles that are of the same phase, with each of said circumferentially adjacent ones of said salient poles facing one of said permanent magnets that is different in polarity relative to the one of said permanent magnets that is faced by another of said circumferentially adjacent ones of said salient poles, with said circumferentially adjacent ones of said salient poles that are of the same phase facing respective ones of said permanent magnets at the same electric angle, and with the number of pole-pairs being equal in number to the number of phases,
   wherein an angle $\theta 1$ between said circumferentially adjacent ones of said salient poles that are of the same phase is equal to $360°/N$, and an angle $\theta 2$ between circumferentially adjacent ones of said salient poles that are not of the same phase is equal to $\theta 1+(\theta 1/P)$, with P being the number of phases and N being the number of poles of said permanent magnets, and
   wherein an angle X of said each one of said two pole-pair groups is equal to an integral multiple of an arrangement interval of said permanent magnets.

2. The dynamo-electric machine according to claim 1, wherein
   a winding direction of the coil wound around said each of said circumferentially adjacent ones of said salient poles is opposite to a winding direction of the coil wound around said another of said circumferentially adjacent ones of said salient poles.

3. The dynamo-electric machine according to claim 2, wherein
   $P\times(\theta 1+\theta 2)$ is equal to or less than $180°$.

4. The dynamo-electric machine according to claim 2, further comprising:
   additional salient poles, each wound with a coil, in said space,
   wherein each of said additional salient poles is disposed adjacent a respective one of said pole-pair groups at said angle $\theta 1$.

5. The dynamo-electric machine according to claim 2, wherein
   said rotor is rotatably disposed on the outer circumference of said stator.

6. The dynamo-electric machine according to claim 2, wherein
   said rotor is rotatably disposed on the inner circumference of said stator.

7. The dynamo-electric machine according to claim 2, wherein
   the dynamo-electric machine is a starter-generator for a motorcycle.

8. The dynamo-electric machine according to claim 1, wherein
   $P\times(\theta 1+\theta 2)$ is equal to or less than $180°$.

9. The dynamo-electric machine according to claim 8, further comprising:
   additional salient poles, each wound with a coil, in said space,
   wherein each of said additional salient poles is disposed adjacent a respective one of said pole-pair groups at said angle $\theta 1$.

10. The dynamo-electric machine according to claim 8, wherein said rotor is rotatably disposed on the outer circumference of said stator.

11. The dynamo-electric machine according to claim 8, wherein
said rotor is rotatably disposed on the inner circumference of said stator.

12. The dynamo-electric machine according to claim 8, wherein
the dynamo-electric machine is a starter-generator for a motorcycle.

13. The dynamo-electric machine according to claim 1, further comprising:
additional salient poles, each wound with a coil, in said space,
wherein each of said additional salient poles is disposed adjacent a respective one of said pole-pair groups at said angle θ1.

14. The dynamo-electric machine according to claim 13, wherein
said rotor is rotatably disposed on the outer circumference of said stator.

15. The dynamo-electric machine according to claim 13, wherein
said rotor is rotatably disposed on the inner circumference of said stator.

16. The dynamo-electric machine according to claim 13, wherein
the dynamo-electric machine is a starter-generator for a motorcycle.

17. The dynamo-electric machine according to claim 1, wherein
said rotor is rotatably disposed on the outer circumference of said stator.

18. The dynamo-electric machine according to claim 17, wherein
the dynamo-electric machine is a starter-generator for a motorcycle.

19. The dynamo-electric machine according to claim 1, wherein
said rotor is rotatably disposed on the inner circumference of said stator.

20. The dynamo-electric machine according to claim 19, wherein
the dynamo-electric machine is a starter-generator for a motorcycle.

21. The dynamo-electric machine according to claim 1, wherein
the dynamo-electric machine is a starter-generator for a motorcycle.

22. The dynamo-electric machine according to claim 1, wherein
the dynamo-electric machine functions as a generator, with a magnetic path formed between said circumferentially adjacent ones of said salient poles of the same phase, at a time of power generation, being shorter than a magnetic path formed between circumferentially adjacent ones of salient poles for another dynamo-electric machine having the same number of poles of permanent magnets but having all of the salient poles being equally spaced,
such that coil inductance of the dynamo-electric machine is larger than coil inductance in the another dynamo-electric machine.

23. The dynamo-electric machine according to claim 22, wherein
the dynamo-electric machine functions as a generator, and when magnetic paths are formed between said circumferentially adjacent ones of said salient poles of the same phase and between the salient poles of one of said circumferentially adjacent ones of said salient poles and a circumferentially adjacent salient pole of an adjacent pole pair, the number of fluxes generated between said circumferentially adjacent ones of said salient poles of the same phase can be greater than fluxes generated between said one of said circumferentially adjacent ones of said salient poles and the circumferentially adjacent salient pole of the adjacent pole pair.

24. The dynamo-electric machine according to claim 1, wherein
the dynamo-electric machine functions as a generator, and when magnetic paths are formed between said circumferentially adjacent ones of said salient poles of the same phase and between one of said circumferentially adjacent ones of said salient poles and a circumferentially adjacent salient pole of an adjacent pole pair, the number of fluxes generated between said circumferentially adjacent ones of said salient poles of the same phase can be greater than fluxes generated between said one of said circumferentially adjacent ones of said salient poles and the circumferentially adjacent salient pole of the adjacent pole pair.

25. The dynamo-electric machine according to claim 1, wherein
the dynamo-electric machine is constructed and arranged such that fluxes are passed between said circumferentially adjacent ones of said salient poles of the same phase and between one of said circumferentially adjacent ones of said salient poles and a circumferentially adjacent salient pole of a different phase, when said circumferentially adjacent ones of said salient poles of the same phase face said permanent magnets.

* * * * *